United States Patent [19]
Sakagami et al.

[11] Patent Number: 5,905,882
[45] Date of Patent: May 18, 1999

[54] ELECTRONIC-EQUIPMENT CONTROL APPARATUS, ELECTRONIC-EQUIPMENT CONTROL METHOD AND ELECTRONIC-EQUIPMENT CONTROL SYSTEM

[75] Inventors: Yasuhiko Sakagami; Takahiko Sueyoshi, both of Tokyo, Japan

[73] Assignee: Sony Corporation, Tokyo, Japan

[21] Appl. No.: 08/590,943

[22] Filed: Jan. 24, 1996

[30] Foreign Application Priority Data

Feb. 6, 1995 [JP] Japan .................................. 7-017886

[51] Int. Cl.$^6$ .................................................. G06F 13/00
[52] U.S. Cl. ........................................................ 395/500
[58] Field of Search ..................................... 395/500, 309

[56] References Cited

U.S. PATENT DOCUMENTS

| | | | |
|---|---|---|---|
| 4,805,169 | 2/1989 | Van Asselt ................................ | 370/85 |
| 5,200,993 | 4/1993 | Wheeler et al. ......................... | 379/96 |
| 5,311,595 | 5/1994 | Bjerrum et al. ......................... | 380/25 |
| 5,345,447 | 9/1994 | Noel ........................................ | 370/67 |
| 5,490,134 | 2/1996 | Fernandez et al. ...................... | 370/79 |
| 5,495,594 | 2/1996 | MacKenna et al. ..................... | 395/500 |
| 5,497,373 | 3/1996 | Hulen et al. ............................. | 370/79 |

FOREIGN PATENT DOCUMENTS

| | | |
|---|---|---|
| 0319235 | 11/1988 | European Pat. Off. . |
| 0560593 | 3/1993 | European Pat. Off. . |

OTHER PUBLICATIONS

J.D. Calvet et al., "Interactive Video Communication Evolution," Electrical Communication, 1994, pp. 284,285.

R.S. Burroughs, "A Point of Entry Interface for 2–Way Broadband Information Delivery," Proceedings From Eleven Technical Sessions of the Annual Convention and Exposition of the National Cable Television Association, San Francisco, Jun. 6–9, 1993, pp. 52–61.

"An Overview of the Futurebus+ Interface Family," Microprocessors and Microsystems, vol. 18, No. 9, Nov. 1, 1994, p. 564.

M. Murata, et al., "A Proposal For Standardization of Home Bus System For Home Automation," IEEE Transactions on Consumer Electronics, vol. 29, No. 4, Nov. 1983, pp. 524–529.

B.J. Rogers, "The Interconnection of Consumer Electronic Products," Electronic Technology, vol. 17, No. 4, Apr. 1, 1983, pp. 66–67.

Roger Richards, "A New Audio, Video and Control Interconnection Standard for Consumer Electronic Devices," Digest of Technical Papers of the International Conference on Consu Electronics (ICCE), Jun. 21–23, 1994, pp. 258–259.

Primary Examiner—Kevin J. Teska
Assistant Examiner—Ayni Mohamed
Attorney, Agent, or Firm—Jay H. Maioli

[57] ABSTRACT

An electronic-equipment system is formed by a home switch connected to a telephone, a VCR, an audio apparatus, a-personal computer, a set-top box (decoder) and a television receiver by home data lines. The home switch transmits data received from the pieces of electronic equipment to destinations through a public data line. Before being transmitted to a destination, the data is first converted into data in a predetermined internal protocol and then converted into data in a protocol for the public data line. The home switch also receives incoming data transmitted through the public data line. The received data undergoes reversed protocol conversion before being transmitted to the electronic equipment. In addition, data output by a piece of electronic equipment can be transmitted to another piece of electronic equipment at the same home through the home switch.

3 Claims, 5 Drawing Sheets

ELECTRONIC-EQUIPMENT CONTROL APPARATUS, ELECTRONIC-EQUIPMENT CONTROL METHOD AND ELECTRONIC-EQUIPMENT CONTROL SYSTEM

BACKGROUND OF THE INVENTION

In general, the present invention relates to an electronic-equipment control apparatus, an electronic-equipment control method and an electronic-equipment control system. In particular, the present invention relates to an electronic-equipment control apparatus, an electronic-equipment control method and an electronic-equipment control system which allow a plurality of pieces of electronic equipment at home to be combined into an integrated single system.

In recent years, personal computers (also referred to hereafter simply as PCs for the sake of convenience) are getting popular also at home as well at the office. By using a personal computer and a modem, a data base and a network can be accessed from a home through an ordinary public telephone line in order to search for certain data or enjoy so-called PC communication.

In addition, particularly in the U. S. A., with the popularization of coaxial and optical-fiber cables, a cable company can provide a special decoder (or a set-top box), allowing services such as videos on demand and viewer participation programs taking advantage of bi-directional capabilities to be rendered.

However, a variety of such conventional home apparatuses (or pieces of home electronic equipment) are connected as individual units. To be more specific, the telephone line is connected to a modem directly while a cable is connected directly to a decoder for example. As a result, in the case of a home in which a plurality of personal computers exist, for example, communication among the personal computers must be carried out through an external network. On the top of that, video data received by a decoder can only be recorded in a VCR (Video Cassette Recorder) of the system. As a result, in order to process the received video data by means of a personal computer, another special apparatus is thus required, giving rise to a problem that it is difficult to utilize a number of apparatuses as a single integrated system.

An AV (Audio Video) system has been proposed wherein a plurality of pieces of AV equipment are connected by using an AV bus to form a single integrated system. However, only the so-called AV equipment can be connected to the system. It is difficult to include electronic equipment such as personal computer which has characteristics different from the AV equipment in the system.

SUMMARY OF THE INVENTION

It is an object of the present invention to allow a number of pieces of electronic equipment to be used as a single integrated system.

According to a first aspect of the present invention, there is provided an electronic-equipment control apparatus which comprises a first terminal connected to a first piece of electronic equipment, a second terminal connected to a second piece of electronic equipment, a third terminal connected to a public communication line for transmitting data having an appended ID indicating the address of a transmission destination, a first protocol converting unit connected to the first terminal, a second protocol converting unit connected to the second terminal, and a third protocol converting unit connected to the third terminal, wherein the first, second and third protocol converting units each output data received from the first, second or third terminal connected thereto to at least one of the other protocol converting units in accordance with a predetermined internal protocol and outputs data received from another protocol converting unit to the associated terminal in accordance with a protocol for the connected electronic equipment.

According to a second aspect of the present invention, there is provided an electronic-equipment control method adopted by an electronic-equipment control apparatus common to a public communication line for transmitting data having an appended ID indicating the address of a transmission destination and a plurality of pieces of electronic equipment, which are connected to the electronic-equipment control apparatus, whereby data input from the public supplying communication line or the electronic equipment is first converted into data in a predetermined internal protocol and then converted into data to be output to the electronic equipment or the public communication line in accordance with a protocol for the electronic equipment or the public communication line.

According to a third aspect of the present invention, there is provided an electronic-equipment control system which comprises an electronic-equipment control apparatus connected to a public communication line for transmitting data having an appended ID indicating the address of a transmission destination and a plurality of pieces of electronic equipment connected to the electronic-control control apparatus, the electronic-control control apparatus first converts data input from the electronic equipment or the public communication line into data in a predetermined internal protocol and then converts it into data to be output to the public communication line or the electronic equipment in accordance with a protocol for the public communication line or the electronic equipment.

In an electronic-equipment control system wherein an electronic-equipment control apparatus is employed and an electronic-equipment control method is adopted, the electronic-equipment control apparatus first converts data input from electronic equipment or a public communication line into data in a predetermined internal protocol and then converts it into data to be output to the public communication line or the electronic equipment in accordance with a protocol for the public communication line or the electronic equipment.

DESCRIPTION OF THE PREFERRED EMBODIMENTS

Figure 1:
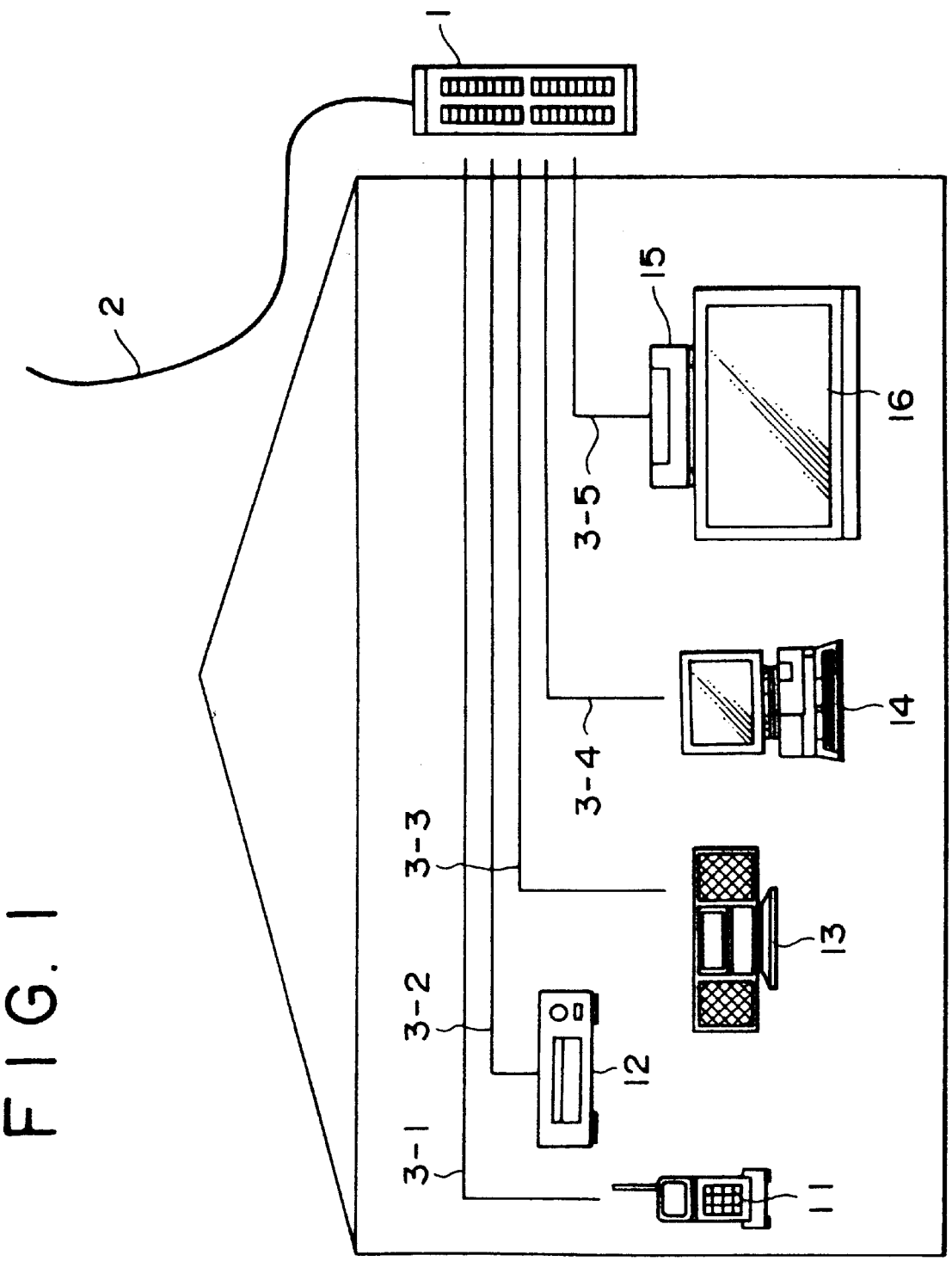
FIG. 1 is a block diagram showing a typical configuration of a home system provided by the present invention.

FIG. 1 shows a typical configuration of a home system (or an electronic-equipment control system) provided by the present invention. In the case of this embodiment, a public data line (or a public communication line) 2 such as a coaxial cable or an optical fiber cable is connected to a home switch 1 as shown. As shown in FIG. 1, the home switch 1 is connected not only to the so-called AV equipment such as a VCR 12, an audio apparatus 13 and a set-top box (decoder) 15 for supplying a decoded video signal to a television receiver 16, but also to a telephone 11 serving as communication equipment and a personal computer 14 serving as a data processing apparatus by home data lines 3-2, 3-3, 3-5, 3-1 and 3-4 respectively.

Figure 2:
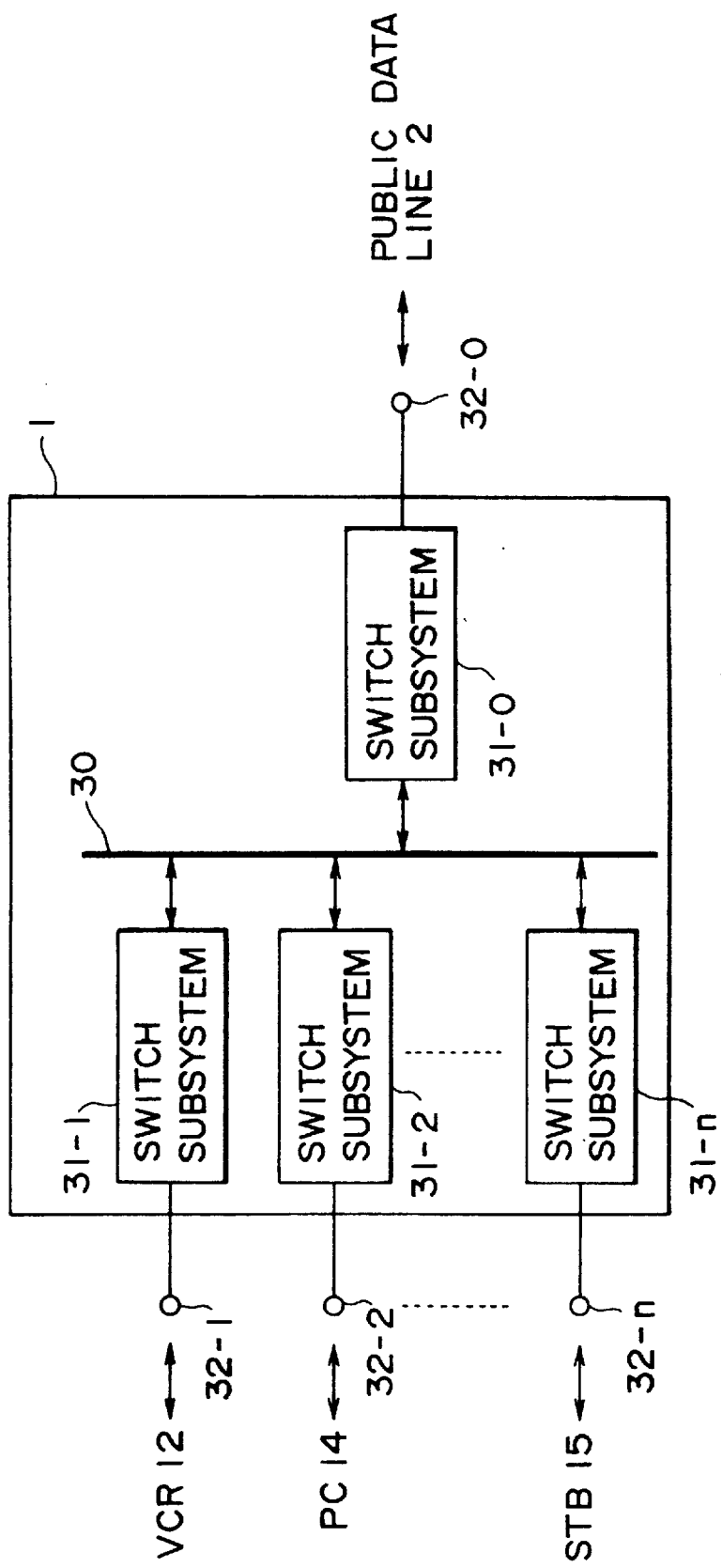
FIG. 2 is a block diagram showing a typical configuration of a home switch 1 shown in FIG. 1.

The home switch 1 serving as an electronic-equipment control apparatus has a typical configuration shown in FIG. 2. In this embodiment, (n+1) terminals 32-0 to 32-n are provided as shown. Connected to the terminal 32-0 is a public data line 2 for transmitting data packets with each packet having an appended ID for indicating the address of a destination as is the case with an ATM (Asynchronous Transfer Mode) network. Connected to the other terminals 32-1 to 32-n are n pieces of electronic equipment. The terminals 32-0 to 32-n are also connected to switch subsystems 31-0 to 31-n respectively. These switch subsystems 31-0 to 31-n are connected to each other by a high-speed bus 30.

It should be noted that, in the case of bi-directional communication services using a CATV (cable-television) network or a public data network, each home terminal such as a personal computer or a set-top box is assigned a unique address. Each home terminal transmits and receives data packets each having an appended transmission address (or a destination address) in accordance with a communication protocol determined in advance.

Figure 3:
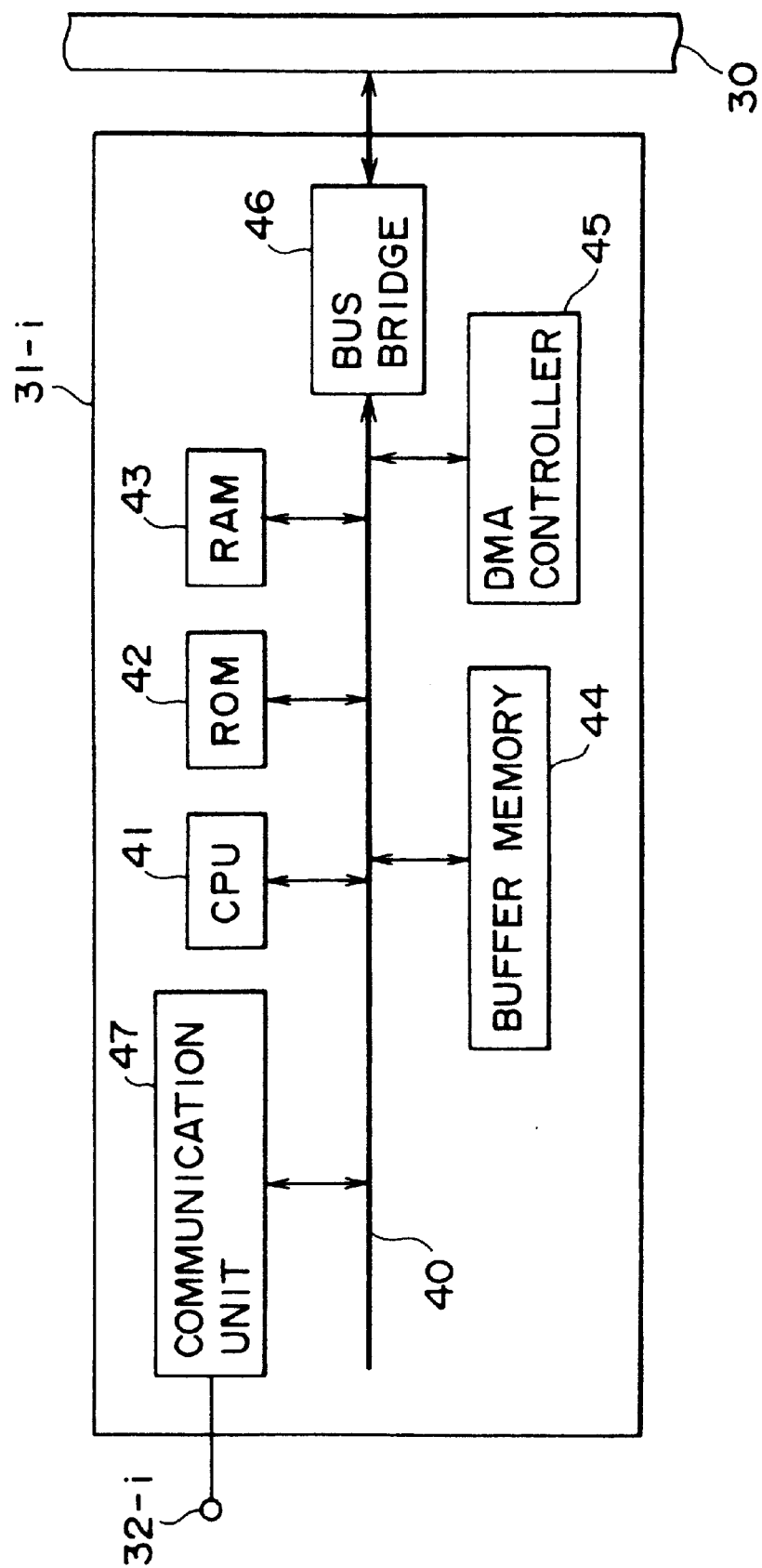
FIG. 3 is a block diagram showing a typical configuration of a switch subsystem shown in FIG. 2.

The switch subsystems 31-i, where i=0 to n, each have a typical configuration shown in FIG. 3. A CPU 41 executes various kinds of processing in accordance with programs stored in a ROM unit 42. Data required in the processing is stored in a RAM unit 43. A buffer memory unit 44 is used for temporarily storing data. A DMA controller 45 controls DMA transfers of data stored in the RAM unit 43. The CPU 41, the ROM unit 42, the RAM unit 43, the buffer memory unit 44 and the DMA controller 45 are connected to each other by a local bus 40 which is connected to the high-speed bus 30 through a bus bridge 46. A communication unit 47 inputs and outputs data from and to the terminals 32-i.

Figure 4:
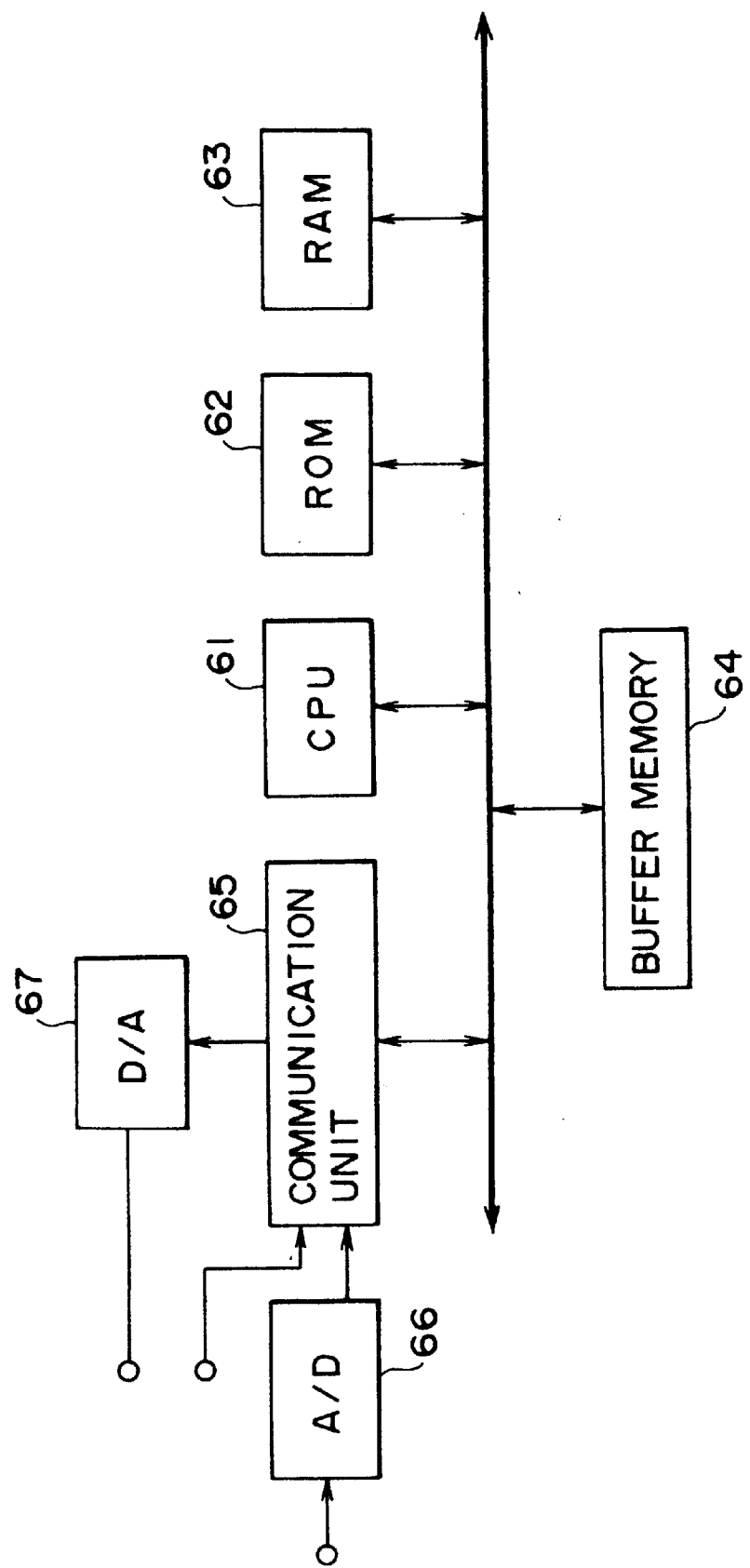
FIG. 4 is a block diagram showing a typical configuration of a circuit employed in the electronic equipment shown in FIG. 1.

In addition, in the case of this embodiment, a circuit (serving as an interface) shown in FIG. 4 is provided for the telephone 11, the VCR 12, the audio apparatus 13, the personal computer 14 and the set-top box 15 so as to allow signals to be exchanged with the home switch 1.

In the case of an interface circuit provided for telephone 11, for example, an A/D converter 66 converts the voice of the user into an input digital audio signal whereas a D/A converter 67 converts digital audio data supplied thereto into an output analog signal. A communication unit 65 outputs digital audio data supplied by the A/D converter 66 to the home switch 1 through the home data line 3-1 of FIG. 1. The communication unit 65 also receives digital audio data from the home switch 1 through the home data line 3-1, supplying the digital audio data to the D/A converter 67 to be converted into an analog signal. The buffer memory unit 64 is used for temporarily storing digital data exchanged through the communication unit 65.

A CPU 61 executes various kinds of processing in accordance with programs stored in a ROM unit 62 Data required in the processing is stored in a RAM unit 63.

The circuit shown in FIG. 4 allows data to be exchanged digitally between the various pieces of electronic equipment and the home switch 1.

Figure 5:
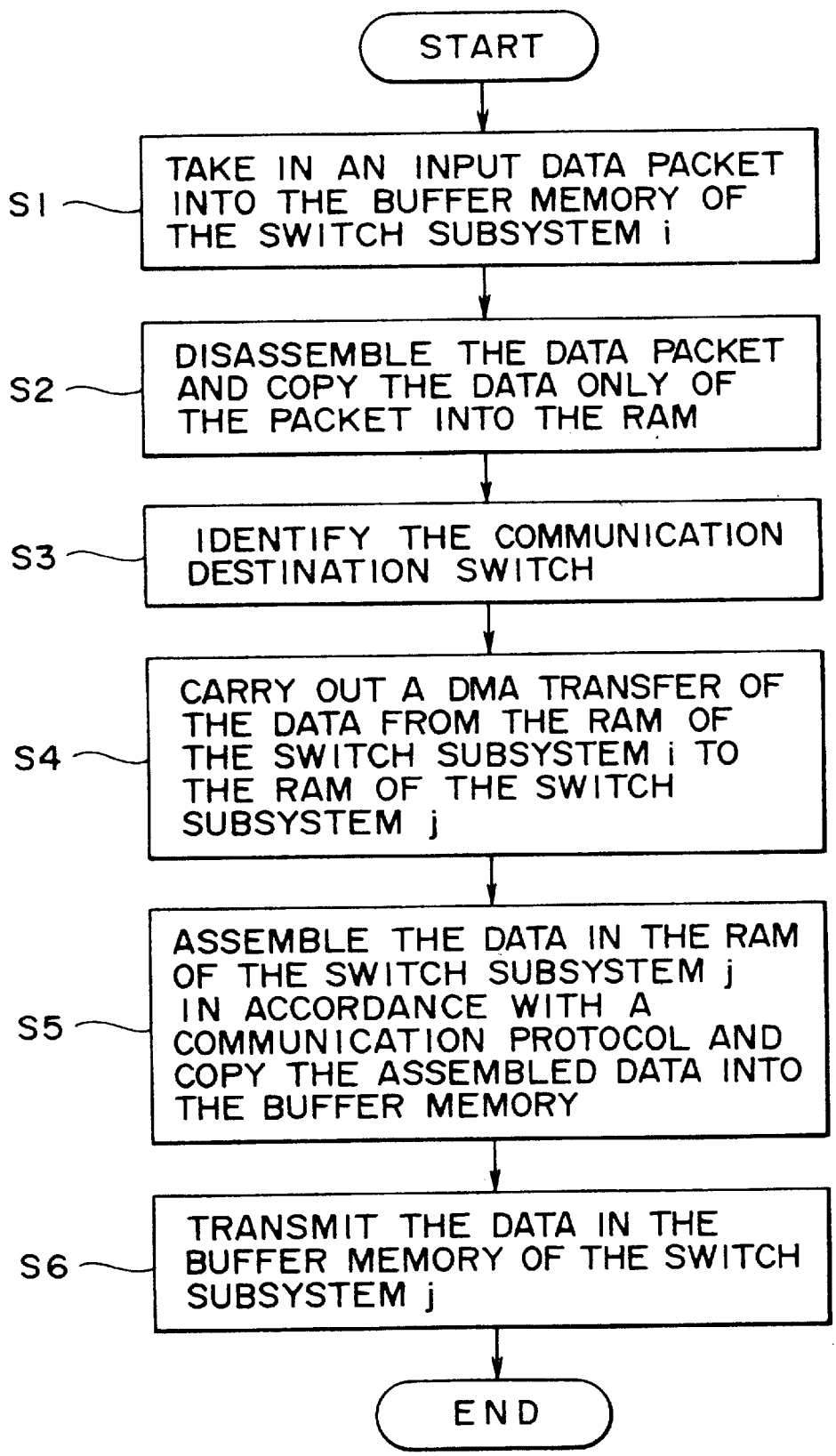
FIG. 5 is a flowchart used for explaining operations of the embodiment shown in FIG. 2.

Next, operations to transmit data from a certain piece of electronic equipment to a public data line 2 are explained by referring to a flowchart shown in FIG. 5.

When signals are played back from a cassette video tape, for example, in the VCR 12, one of pieces of electronic equipment connected to the home switch 1, the playback analog video and audio signals are converted by the A/D converter 66 into digital data before being temporarily stored in the buffer memory unit 64 through the communication unit 65. The CPU 61 then transfers the digital video and audio data to the RAM unit 63 to be stored therein for conversion into packets. An ID is added to each video packet for indicating that the packet is video data and indicating the address of a destination. Likewise, an ID is added to each audio packet for indicating that the packet is audio data and indicating the address of a destination. The video and audio packets are then transferred to the buffer memory unit 64 to be temporarily stored therein. The packets are finally read out from the buffer memory unit 64 before being supplied to the home switch 1 from the communication unit 65 through the home data line 3-2.

At a step S1 shown in FIG. 5, packet data input from its terminal 32-1 is taken into the buffer memory unit 44 through the communication unit 47 of the switch subsystem 31-1. The CPU 41 disassembles packet data stored in the buffer memory unit 44, extracting a portion excluding its header, that is, only contents of a data portion. The processing flow then continues to the step S2 to copy the extracted data portion are extracted into the RAM unit 43. The processing flow then proceeds to a step S3 to determine the destination switch of the data.

An example of the destination switch is a switch subsystem 31-0 connected to the public data line 2.

The processing flow then proceeds to a step S4 at which the DMA controller 45 of the switch subsystem 31-1 controls DMA transfers of video and audio data including IDs indicating the address of a destination from the RAM unit 43 to the RAM unit 43 of the switch subsystem determined at the step S3 through the bus bridge 46 and the high-speed bus 30. An example of the destination of the DMA transfer is the RAM unit 43 of the switch subsystem 31-0.

The processing flow then continues to a step S5 at which the CPU 41 of the switch subsystem 31-0 assembles the video and audio data transferred to the RAM unit 43 thereof in accordance with a communication protocol for the public data line 2 and copies the assembled data into the buffer memory unit 44. The processing flow then proceeds to a step S6 to transmit the video and audio data stored in the buffer memory unit 44 along with its IDs indicating the address of the destination to an apparatus not shown in FIG. 3.

It should be noted that each switch subsystem 31-i outputs data received from another switch subsystem to the corresponding terminal as it is, if the protocol of the electronic equipment connected to the corresponding terminal is a protocol which does not specially require conversion. From the types of electronic equipment connected to the switch subsystems, the user can determine whether or not it is essentially necessary to carry out protocol conversion.

As described above, the output of any arbitrary electronic equipment can be transmitted to another apparatus through a public data line 2. Conversely, data can be received from another apparatus, which data is transmitted through the public data line 2. In addition, by selecting a switch subsystem other than the switch subsystem 31-0 at the step S3, data can be exchanged among pieces of electronic equipment at the same home without the necessity to output the data outside of the home.

In an electronic-equipment control system wherein an electronic-equipment control apparatus is employed and an electronic-equipment control method is adopted, the electronic-equipment control apparatus first converts data input from a electronic equipment or public communication line into data in a predetermined internal protocol and then converts it into data to be output to the public communication line or the electric equipment in accordance with a protocol for the public communication line or the electric equipment. As a result, data can be exchanged among numerous pieces of electronic equipment, allowing the electronic equipment to be used effectively as a single integrated system.

What is claimed is:

1. An electronic-equipment control apparatus comprising:
   a first terminal connected to a first piece of electronic equipment;
   a second terminal connected to a second piece of electronic equipment;
   a third terminal connected to a public communication line, wherein said first and second pieces of electronic equipment and said public communication line transmit data having appended thereto an ID indicating an address of a transmission destination;
   a first protocol converting unit connected to said first terminal;
   a second protocol converting unit connected to said second terminal;
   a third protocol converting unit connected to said third terminal; and
   a high-speed bus for interconnecting outputs of said first, second and third protocol converting units,
   wherein said first, second and third protocol converting units each output data respectively received from said first, second and third terminals in accordance with a predetermined internal protocol, and wherein output data received by one of said first, second and third protocol converting units corresponding to said transmission destination from another one of said first, second and third protocol converting units is transmitted to said transmission destination using a corresponding predetermined protocol, wherein each one of said first, second and third protocol converting units includes a DMA controller for controlling DMA transfers of data through said high-speed bus.

2. The electronic-equipment control apparatus according to claim 1, wherein said first and second pieces of electronic equipment comprise one of audio/video related equipment, computer related equipment and communication related equipment.

3. The electronic-equipment control apparatus according to claim 1, wherein one of said first and second pieces of electronic equipment exchange data with one of said first and second protocol converting units connected to said first and second terminals, respectively, after converting an internal input/output analog signal into an input/output digital signal.

* * * * *